Sept. 10, 1946.  C. H. JUDD ET AL  2,407,609

FASTENING DEVICE

Original Filed Nov. 28, 1942

INVENTOR.
Charles H. Judd and Charles Giammatteo,
BY Bates, Teare & McBean,
Attorneys.

Patented Sept. 10, 1946

2,407,609

UNITED STATES PATENT OFFICE 2,407,609

FASTENING DEVICE

Charles H. Judd and Charles Giammatteo, Cleveland, Ohio, assignors to Tinnerman Products, Inc., Cleveland, Ohio, a corporation of Ohio Original application November 28, 1942, Serial No. 467,224, now Patent No. 2,345,053, dated March 28, 1944. Divided and this application July 22, 1943, Serial No. 495,715

2 Claims. (Cl. 85—32)

This application is a division of our application Serial No. 467,224, filed November 28, 1942, for a fastening device, which issued as Patent No. 2,345,053 on March 28, 1944. This invention is concerned particularly with a fastening device in the form of a corner bracket, one arm of which has means for securing it to a panel while the other arm carries thread-engaging means adapted to coact with a bolt projecting from a panel at an angle to the first panel.

Our fastener comprises a body of sheet material bent to form an angle bracket one arm of which has projections bent at substantially right angles to the body to provide prongs which may enter a wooden panel to hold that arm of the fastener in position against the inner face of the panel, while the projecting arm of the body has a bolt opening and carries means to engage a bolt which may pass through the opening from another panel. This enables two panels to be secured together at their internal corner.

In the preferred form the thread-engaging means is made by a separate clip doubled on itself to embrace that arm of the body and having a bolt opening through both clip arms registering with that of the bracket arm, one arm of the clip being deformed adjacent its bolt opening to provide thread-engaging edges.

The legs which attach the clip to the first panel are comparatively thin and narrow, one set being bent from the end of the body arm, the other set cut out from an intermediate region thereof and bent therefrom. These legs are preferably beveled on their inner edges adjacent their free ends so that as they enter the wood they would be caused to flare or bend outwardly to obtain a firm hold on the wooden panel.

Figure 1:
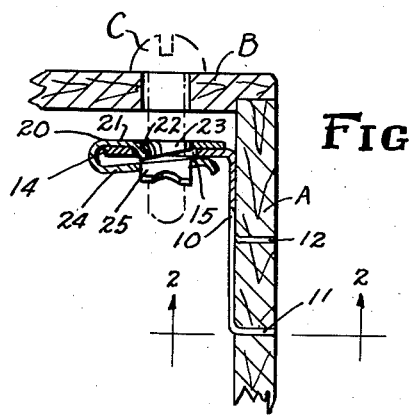
Figure 3:
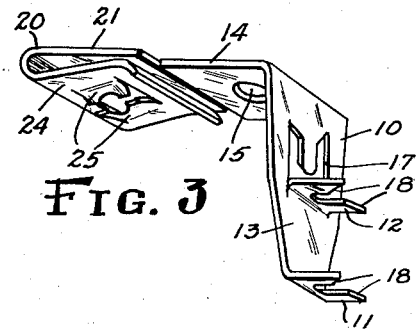
Figure 4:
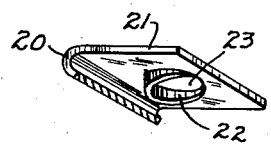
Figure 2:
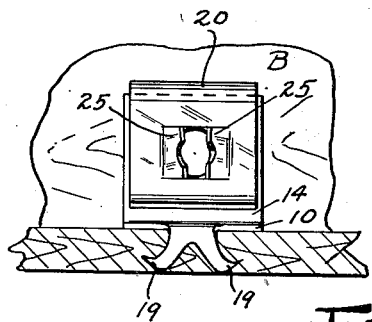

In the drawing, Fig. 1 is a sectional side elevation of our fastening device in position on a wooden support and adapted to receive a bolt passing through the panel at right angles to the support; Fig. 2 is a bottom view of the attached fastening device shown in Fig. 1, being sectioned through the panel to which the device is attached in a plane indicated by the line 2—2 on Fig. 1, looking upwardly; Fig. 3 is a perspective of the body and clip of the fastening device separated from each other; Fig. 4 is a fragmentary perspective of one of the arms of the separate clip and part of the return bend looking at the inner face thereof.

As shown in Figs. 1, 2 and 3, the body portion 10 of our angle fastener has two sets of legs 11 and 12 projecting at right angles to a flat base 13, while a flange 14 extends from this base portion in the opposite direction to the legs and at right angles to it. This flange has an opening 15 for the passage of a bolt. The legs 11 are preferably turned over from the end of the base 13 while the legs 12 are partially severed from an intermediate region of the base, as indicated by the opening 17 in Fig. 3. The legs of each pair lie in the same plane with each other, at right angles to the base. The legs 11 and 12 are thin, comparatively narrow members, the inner edges of which are beveled outwardly at 18 in Fig. 3 so that the legs will flare when driven into a wooden panel.

If the panel is thin, as indicated in Figs. 1 and 2 and an anvil placed against the outer face, the legs when driven into the wood and engaging the anvil will be curled outwardly as indicated at 19 in Fig. 2, or the points of the legs may curl longitudinally as they strike the anvil or may take a course both longitudinal and lateral. In any case the legs will become firmly interlocked with the wooden panel.

We have shown the portion of the fastener which engages the stud or bolt as a separate sheet metal member 20 doubled on itself to produce two arms adapted to embrace the projecting arm 14 of the body. As shown, the upper arm 21 has an inclined edge 22 about the bolt opening 23, while the lower arm 24 has a pair of inclined tongues 25 about its bolt opening. These tongues, as shown, are provided with recesses in their ends and are warped so that they may provide thread-engaging means to engage a bolt passing through the three aligned openings.

Figs. 1 and 2 show the body firmly secured to a thin wooden panel A with the angle arm projecting parallel with another panel B. This enables a threaded bolt or screw C to pass through an opening in the panel B and find its nut in the fastener. Our device may be very effectively used, for instance, for retaining a lid on a wooden box or crate while enabling its ready removal whenever desired, by the mere removal of the attaching screws.

Our fastener may be made economically of spring sheet steel by dies and bending tools. Since the attaching legs of each pair stand close to each other, they may be readily driven into a wood by a blow of a hammer against the body portion at the end of the legs without danger of distorting the body. When in place the curled legs firmly attach the fastener.

We claim:

1. A combined nut and nut holder comprising a nut holder provided from a section of sheet metal bent to define a body and a flange on one end of said body extending in angular relation thereto, a nut carried by said flange comprising bolt engaging means overlying an opening in the flange and a portion for retaining the nut in attached position on said flange, the other end of the nut holder body comprising an attaching prong projecting angularly therefrom, and another prong bent from said body and projecting in the same general direction as the first named prong.

2. A combined nut and nut holder comprising a nut holder provided from a section of sheet metal bent to define a body and a flange on one end of said body extending in angular relation thereto, a nut carried by said flange comprising bolt engaging means overlying an opening in the flange and a portion for retaining the nut in attached position on said flange, the other end of the nut holder body comprising a pair of attaching prongs projecting angularly therefrom, and another pair of prongs bent from said body and projecting in the same general direction as the first named pair of prongs, said prongs being bevelled on their inner edges adjacent their free ends to spread when driven into work.

CHARLES H. JUDD.
CHARLES GIAMMATTEO.